(12) United States Patent
Yamada

(10) Patent No.: US 7,706,085 B2
(45) Date of Patent: Apr. 27, 2010

(54) IMAGING OPTICAL SYSTEM AND IMAGING APPARATUS COMPRISING THE SAME

(75) Inventor: Yasuharu Yamada, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/322,689

(22) Filed: Feb. 4, 2009

(65) Prior Publication Data

US 2009/0201592 A1    Aug. 13, 2009

(30) Foreign Application Priority Data

Feb. 7, 2008    (JP)    .............................. 2008-027164

(51) Int. Cl.
  G02B 9/60    (2006.01)
  G02B 3/02    (2006.01)
(52) U.S. Cl. ...................................... 359/765; 359/717
(58) Field of Classification Search ................. 359/714, 359/717, 740, 765, 793
See application file for complete search history.

(56) References Cited

U.S. PATENT DOCUMENTS 5,731,912 A    3/1998    Abe
6,239,921 B1*    5/2001    Isono .......................... 359/717

FOREIGN PATENT DOCUMENTS

JP    09-133859    5/1997
JP    2000-180719    6/2000

* cited by examiner

*Primary Examiner*—William C Choi
(74) *Attorney, Agent, or Firm*—Kenyon & Kenyon LLP

(57) ABSTRACT

An imaging optical system includes: an object-side lens group having, in order from its object side, an object-side positive meniscus lens that is convex on its object side and has positive refracting power, and an object side negative meniscus lens that is convex on its object side and has negative refracting power; and image-side lens group having, in order from its object side, an image-side negative lens, an image-side first positive lens and an image-side second positive lens. The image-side negative lens and the image-side first positive lens adjacent thereto form together a cemented doublet.

13 Claims, 3 Drawing Sheets

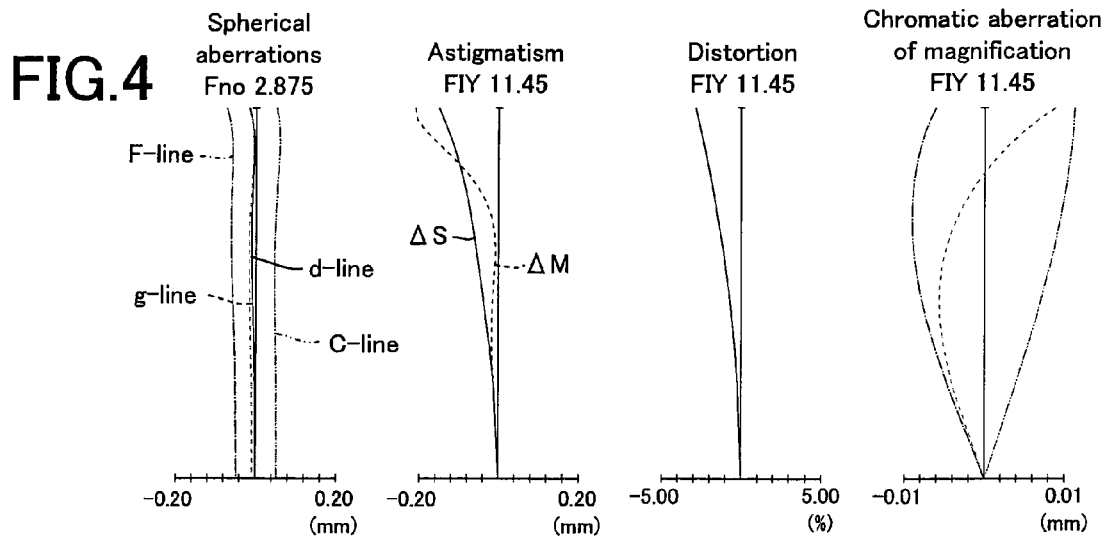
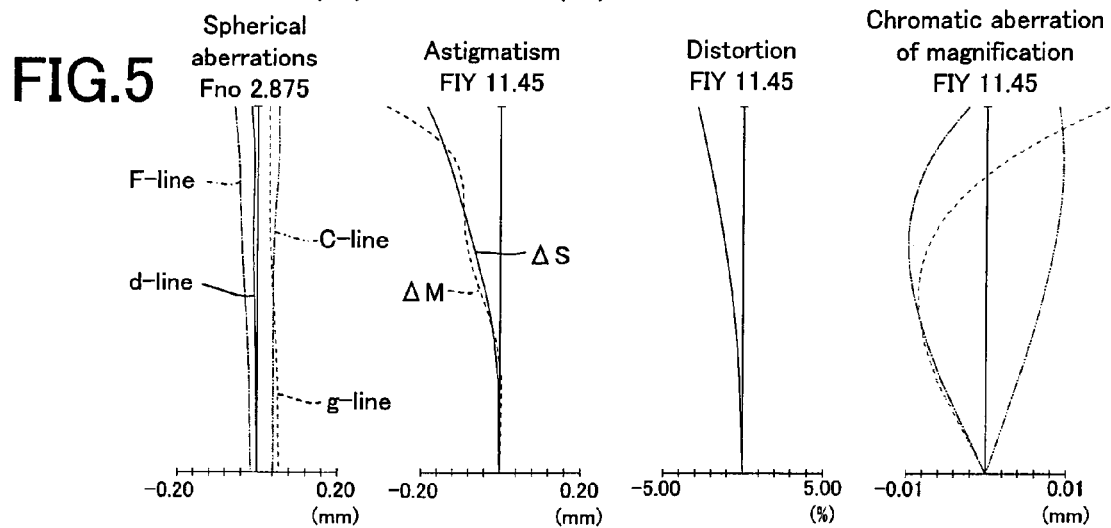
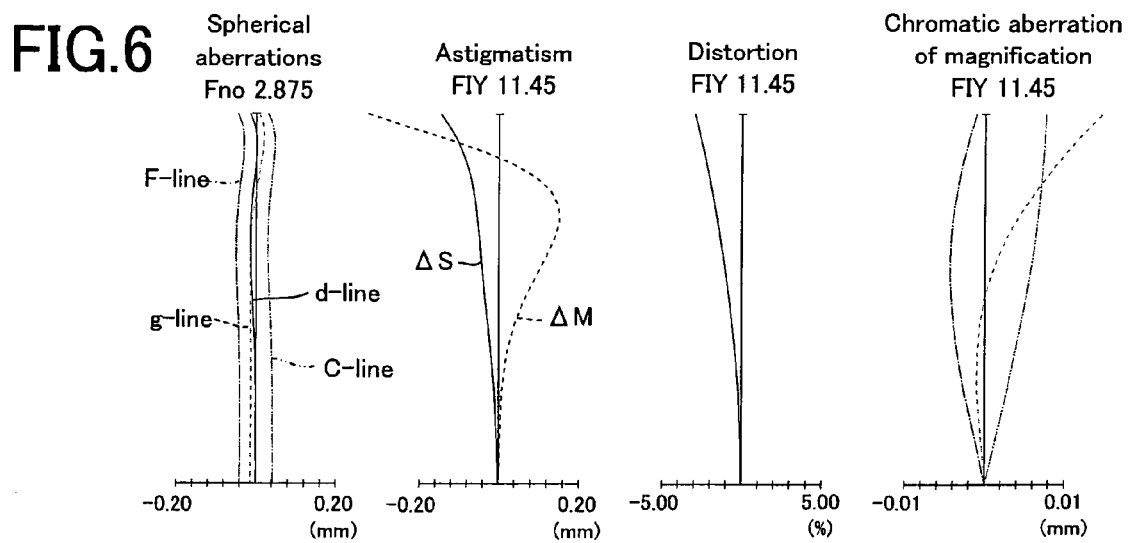

IMAGING OPTICAL SYSTEM AND IMAGING APPARATUS COMPRISING THE SAME

This application claims benefit of Japanese Application No. 2008-027164 filed in Japan on Feb. 7, 2008, the contents of which are incorporated by this reference.

BACKGROUND OF THE INVENTION

The present invention relates generally to an imaging optical system, and more particularly to an imaging apparatus comprising an imaging optical system.

There has been an imaging optical system known so far in the art, which uses five lenses to make improvements in optical performance (see Patent Publications 1 and 2). The publications disclose an imaging optical system that comprises an aperture stop for limiting axial light beams, a lens group that is located on an object side with respect to that aperture stop and consists of two lenses, and a lens group that is located on an image side with respect to that aperture stop, wherein a lens system comprises, in order from its object side, a positive single lens, a negative single lens, a cemented doublet of a negative lens and a positive lens, and a positive single lens.

Patent Publication 1: JP(A) 9-133859
Patent Publication 2: JP(A) 2000-180719

With such imaging optical system as disclosed in Patent Publications 1 and 2, however, the thickness (the axial distance from the object side surface of the lens nearest to the object side to the image side surface of the lens nearest to the image side) grows large relative to the back focus. For this reason, intentional use of such an imaging optical system for interchangeable lenses of single-lens reflex cameras will work against size reductions of the whole imaging apparatus including the imaging optical system.

In view of such problems with the prior art, one object of the present invention is to provide an imaging optical system that works for making sure the given back focus and reducing thickness, and makes it easy to ensure brightness and optical performance. Another object is to provide an imaging apparatus comprising such an imaging optical system.

SUMMARY OF THE INVENTION

According to the invention, the aforesaid objects are accomplishable by the provision of an imaging optical system, comprising:

an aperture stop for limiting an axial light beam,
an object-side lens group that is located on an object side of the aforesaid aperture stop and has negative refracting power, and
an image-side lens group that is located on an image side of the aforesaid aperture stop and has positive refracting power, wherein:

the aforesaid object-side lens group comprises two lenses: in order from its object side,
an object-side positive meniscus lens that is convex on its object side and has positive refracting power, and
an object-side negative meniscus lens that is convex on its object side and has negative refracting power, and
the aforesaid image-side lens group comprises three lenses: in order from its object side, an image-side negative lens, an image-side first positive lens, and an image-side second positive lens, and
the aforesaid image-side negative lens and the aforesaid image-side first positive lens form together a mutually cemented doublet, preferably with the satisfaction of the following conditions (1), (2) and (3):

$$2.3 \leq |f1/f| \leq 5.3 \quad (1)$$

$$0.8 \leq f2/f \leq 1.0 \quad (2)$$

$$0.55 \leq L/f \leq 0.85 \quad (3)$$

where f is the focal length of the whole imaging optical system,
f1 is the focal length of the object-side lens group in the aforesaid imaging optical system,
f2 is the focal length of the image-side lens group in the aforesaid imaging optical system, and L is the axial distance from the vertex of the lens surface located in, and nearest to the object side of, said object-side lens group to the vertex of the lens surface located in, and nearest to the object side of, said image-side lens group.

The aperture stop is almost centrally located in the imaging lens system to set up the aforesaid lens layout so that the refracting powers of the lenses in the imaging optical system are symmetrically distributed, working for correction of distortion, Petzval s sum, spherical aberrations, etc.

Two positive lenses: the image-side first positive lens L22 and the image-side second positive lens L23 are located on the image side of the aperture stop so that an exit pupil can easily be spaced away from an image plane while aberration performance is kept intact, making it easy to hold back deterioration of image quality due to shading.

The cemented doublet of the image-side negative lens L21 and the image-side first positive lens L22 is used for the image-side lens group so that correction of chromatic aberrations, etc. can be facilitated.

The object-side positive lens L11 and the object-side negative lens L12 on the object side with respect to the aperture stop are each configured into a meniscus shape convex on its object side, whereby while letting the object-side positive lens L11 keep functioning to cancel out aberrations occurring from the object-side negative lens L12, the angle of incidence of light rays on the respective lens surfaces in the object-side lens group can easily be kept so small that aberrations at the object-side lens group can easily be reduced.

The imaging optical system of the invention sets up a retrofocus type with the object-side lens group of negative refracting power and the image-side lens group of positive refracting power, and satisfies conditions (1), (2) and (3) for the purpose of making sure the given back focus, slimming-down, brightness, and optical performance.

Conditions (1), (2), and (3) define the preferable focal length of the object-side lens group, the preferable focal length of the image-side lens group, and the preferable position relation of the object- and image-side lens groups, respectively.

Abiding by the lower limit of 2.3 to condition (1) enables the negative refracting power of the object-side lens to be kept from growing too strong, working for the maintenance of optical performance even when the object-side lens group is constructed of two lenses.

Abiding by the upper limit of 5.3 to condition (1) allows the object-side lens group to have negative refracting power, working for making sure the retrofocus type lens group arrangement has the given back focus.

Abiding by the lower limit of 0.8 to condition (2) enables the positive refracting power of the image-side lens to be kept from growing too strong, working for the maintenance of optical performance even when the image-side lens group is constructed of three lenses.

Abiding by the upper limit of 1.0 to condition (2) makes sure the image-side lens group has positive refracting power, working for the slimming-down of the lens system.

Abiding by the lower limit of 0.55 to condition (3) makes sure the distance from the vertex of the lens surface nearest to the object side to the image-side lens group, helping locate the lenses in the object-side lens group in the number necessary for correction of aberrations. It also helps keep the symmetry of the lenses with respect to the aperture stop.

Abiding by the upper limit of 0.85 to condition (3) enables the object-side positive lens L11 nearest to the object side to draw near to the image-side lens group. This in turn makes it possible to curtail the distance between the entrance pupil and the entrance surface of the lens system and reduce the diameters and thicknesses of the lenses in the object-side lens group, working for thickness and diameter reductions. It also works for correction of various aberrations because of a decrease in the effective diameter of the object-side lens group: even with brightness ensured, aberrations can easily be held back.

In the imaging optical system of the invention, the aforesaid cemented doublet is configured into a meniscus shape concave on the aperture stop side, and it is desired that the image-side second positive lens L23 located in, and nearest to the image side of, the aforesaid image-side lens group be convex on its image side surface.

The cemented doublet located on the image side with respect to the aperture stop is configured into a meniscus shape concave on the aperture stop side, and the image-side second positive lens L23 on the image side thereof is convex on its image side surface, whereby it is easy for that image-side lens group to have positive refracting power and, at the same time, to make correction of axial aberrations and off-axis aberrations and achieve diameter reductions.

It is desired that the aforesaid image-side negative lens L21 be a double-concave negative lens, and the aforesaid image-side first positive lens L22 be a double-convex positive lens.

The aforesaid lens arrangement favors correction of various aberrations inclusive of chromatic aberrations by a reduced number of lenses, making surer size reductions and optical performance.

It is desired that at least one of the aforesaid image-side first positive lens L22 or the aforesaid image-side second positive lens L23 have an aspheric convex surface having positive refracting power that becomes weak from the optical axis to the periphery.

The aforesaid arrangement makes it easy to correct under-corrected spherical aberrations, field curvature (that is apt to become minus) and barrel distortion, all likely to occur as the retrofocus type imaging optical system decreases in size, and works more for size reductions and making sure optical performance.

It is desired that the object-side surface of the aforesaid image-side second positive lens L23 have the aforesaid aspheric convex shape.

It is desired that the image-side surface of the aforesaid image-side second positive lens L23 have the aforesaid aspheric convex shape.

The centers of both on-axis and off-axis light beams are reasonably away from the image-side second positive lens L23. Therefore, if one or both of the object- and image-side surfaces of that image-side second positive lens L23 are configured into the aforesaid aspheric convex shape, it is then easier to work for correction of aberrations.

It is desired for the aforesaid object-side negative meniscus lens L12 to satisfy the following condition (4).

$$2.4 \leq (R12f + R12r)/(R12f - R12r) \leq 3.2 \quad (4)$$

where R12$f$ is the paraxial radius of curvature of the object-side lens surface of the aforesaid object-side negative meniscus lens, and R12$r$ is the paraxial radius of curvature of the image-side lens surface of the aforesaid object-side negative meniscus lens.

Preferably, the object-side negative meniscus lens L12 is configured in such a way as to satisfy condition (4) so as to obtain a sensible tradeoff between making sure the negative refracting power and a balance among aberrations.

Condition (4) defines the preferable shape factor of the object-side negative meniscus lens L12.

By abiding by the lower limit of 2.4 to condition (4), the curvatures of the object- and image-side surfaces of the object-side negative meniscus lens L12 are so maintained that even when the object-side lens group is located near to the aperture stop, the angles of incidence of both on-axis and off-axis light beams on that negative lens can be kept small, favoring correction of aberrations.

By abiding by the upper limit of 3.2 to condition (4), the curvatures of the object- and image-side surfaces of the object-side negative meniscus lens L12 are prevented from growing too large so that spherical aberrations, coma, and field curvature at the object-side negative meniscus lens L12 can easily be reduced.

It is desired that the aforesaid object-side positive meniscus lens L11 and the aforesaid object-side negative meniscus lens L12 be each a single lens; the paraxial radius of curvature of the image-side surface of the aforesaid object-side positive meniscus lens L11 be larger than the paraxial radius of curvature of the object-side surface of the aforesaid object-side negative meniscus lens L12; and the aforesaid object-side positive meniscus lens L11 satisfy the following conditions (5) and (6).

$$-5.0 \leq (R11f + R11r)/(R11f - R11r) \leq -1.3 \quad (5)$$

$$0.2 \leq D1/L \leq 0.4 \quad (6)$$

where R11$f$ is the paraxial radius of curvature of the object-side lens surface of the aforesaid object-side positive meniscus lens L11 in the object-side lens group, R11$r$ is the paraxial radius of curvature of the image-side lens surface of the aforesaid object-side positive meniscus lens L11 in the object-side lens group, and D1 is the axial distance of the aforesaid object-side lens group from the vertex of the lens surface located nearest to the object side to the vertex of the lens surface located nearest to the image side.

It is preferable that to slim down the lens system, the object-side positive meniscus lens L11 is brought near to the aperture stop, and to make sure the given back focus, the object-side negative meniscus lens L12 is spaced away from the image-side lens group.

Therefore, in order to offer a reasonable tradeoff between slimming down the object-side lens group itself and the function of correcting various aberrations occurring from the object-side positive meniscus lens L11, it is preferable that the object-side positive meniscus lens L11 and the object-side negative meniscus lens L12 are each a single lens; the paraxial radius of curvature of the image-side surface of the object-side positive meniscus lens L11 is larger than the paraxial radius of curvature of the object-side surface of the object-side negative meniscus lens L12 so that the effect on correction of off-axis light beams can be enhanced; and the aforesaid conditions (5) and (6) are satisfied.

Condition (5) defines the preferable shape factor of the object-side positive meniscus lens L11, and condition (6) defines the axial thickness of the object-side lens group.

By abiding by the lower limit of −5.0 to condition (5), it is easy to make sure the object-side positive meniscus lens L11 has a given height of incidence of light rays and have a function of canceling out aberrations occurring from the negative lens.

By abiding by the upper limit of −1.3 to condition (5), the object-side positive meniscus lens L11 is allowed to have refracting power on the object-side surface; so the lenses can easily have symmetry with respect to the aperture stop, placing aberrations in a well-balanced state.

Abiding by the lower limit of 0.2 to condition (6) makes sure the object-side lens group have the given axial thickness, working for making sure the positive refracting power necessary for correction of aberrations occurring from the object-side positive meniscus lens L11, etc.

Abiding by the upper limit of 0.4 to condition (6) prevents the object-side lens group from growing too thick so that the object-side negative meniscus lens L12 can easily be positioned near to the object, working for making sure the given back focus resulting from the retrofocus arrangement.

It is also desired to satisfy the following conditions (7) and (8).

$$-2.0 \leq f12/f \leq -0.5 \quad (7)$$

$$-2.3 \leq f11/f12 \leq -1.4 \quad (8)$$

where f11 is the focal length of the object-side positive meniscus lens L11, and f12 is the focal length of the object-side negative meniscus lens L12.

To achieve slimming-down and well-balanced aberrations while making sure the object-side lens group has negative refracting power, it is preferable to satisfy the aforesaid conditions (7) and (8).

Conditions (7) and (8) define the preferable focal lengths of the object-side positive and negative meniscus lenses L11 and L12, respectively.

Abiding by the lower limit of −2.0 to condition (7) allows the object-side negative meniscus lens L12 to have negative refracting power, working for maintaining the effect on keeping the back focus long, correction of Petzval s sum, etc.

Abiding by the upper limit of −0.5 to condition (7) allows the object-side negative meniscus lens L12 to have a reasonable refracting power to ease off a load of the object-side positive meniscus lens L11 on correction of aberrations, easily preventing the object-side positive meniscus lens L11 from growing too thick.

Abiding by the lower limit of −2.3 to condition (8) helps the object-side positive meniscus lens maintain its refracting power, working for making sure the function of correcting various aberrations.

Abiding by the upper limit of −1.4 to condition (8) works for reducing the thickness of the object-side positive meniscus lens L11, reducing aberrations occurring from the object-side positive meniscus lens L11 itself, and making sure the given back focus.

It is desired for the aforesaid cemented doublet to satisfy the following conditions (9) and (10).

$$-4.5 \leq R21f/D2122 \leq -1.7 \quad (9)$$

$$0.35 \leq R21f/R22r \leq 0.80 \quad (10)$$

where R21f is the paraxial radius of curvature of the object-side lens surface of the aforesaid image-side negative lens L21, D2122 is the axial thickness of the aforesaid cemented doublet from the vertex of the lens surface located nearest to the object side to the vertex of the lens surface located nearest to the image side, and R22r is the paraxial radius of curvature of the image-side lens surface of the aforesaid image-side first positive lens L22.

By configuring the cemented doublet into a meniscus shape concave on the aperture stop side, the angles of incidence of on-axis and off-axis light beams on the object- and image-side surfaces of the cemented doublet can easily be kept small in a well-balanced state.

It is then preferable for the shape of the cemented doublet to satisfy the aforesaid conditions (9) and (10).

Abiding by the lower limit of −4.5 to condition (9) allows that concave surface to have a reasonable refracting power, working for correction of spherical aberrations and Petzval s sum and making sure the given back focus. It also makes sure the axial thickness of the cemented doublet, working for correction of astigmatism, chromatic aberrations, etc.

Abiding by the upper limit of −1.7 to condition (9) allows the negative refracting power of that concave surface to be prevented from growing too strong, easily holding back higher-order spherical aberrations.

Abiding by the lower limit of 0.35 to condition (10) makes sure the image-side surface of the cemented doublet has positive refracting power so that it can easily share positive refracting power with the image-side second positive lens L23, facilitating correction of various aberrations.

Abiding by the upper limit of 0.80 to condition (10) prevents the positive power of the image-side surface of the cemented doublet from growing too strong, favoring correction of coma, etc. It also works for making sure the quantity of rim light.

It is also desired for the aforesaid cemented doublet to satisfy the following conditions (11) and (12).

$$0.40 \leq D23/D2 \leq 0.60 \quad (11)$$

$$0.50 \leq f23/f \leq 0.90 \quad (12)$$

where D2 is the axial distance of the aforesaid image-side lens group from the vertex of the lens surface located nearest to the object side to the vertex of the lens surface located nearest to the image side, D23 is the axial thickness of the aforesaid image-side second positive lens L23, and f23 is the focal length of the aforesaid image-side second positive lens L23.

Making sure the image-side second positive lens L23 has the given positive refracting power works for making sure the retrofocus type has the given back focus.

Conditions (11) and (12) define the preferable thickness and refracting power of that image-side second positive lens L23, respectively.

Abiding by the lower limit of 0.40 to condition (11) allows the image-side second positive lens L23 to make sure the given axial thickness, working for making sure the positive refracting power.

Abiding by the upper limit of 0.60 to condition (11) works for reductions in the thickness and diametrical size of the imaging optical system.

Abiding by the lower limit of 0.50 to condition (12) allows the image-side second positive lens L23 to have a reasonable refracting power. This is preferable because coma, etc. can easily be reduced.

Abiding by the upper limit of 0.90 to condition (12) makes sure the reasonable positive refracting power. This is preferable because the given back focus is obtained, and the function of spacing the exit pupil away from the image plane is achieved as well.

It is desired for the aforesaid image-side second positive lens L23 to have a convex shape in such a way as to satisfy the following condition (13).

$$0.5 < (R23f + R23r)/(R23f - R23r) < 1.0 \tag{13}$$

where R23$f$ is the paraxial radius of curvature of the object-side lens surface of the aforesaid image-side second positive lens L23, and R23$r$ is the paraxial radius of curvature of the image-side lens surface of the aforesaid image-side second positive lens L23.

The image-side second positive lens L23 is apt to have strong positive refracting power; it should preferably have a shape capable of reducing various aberrations.

Condition (13) defines the preferable shape factor of that image-side second positive lens L23.

Abiding by the lower limit of 0.5 to condition (13) allows the angle of incidence of off-axis light beams to be kept small, working for correction of aberrations. It also helps the image-side second positive lens L23 to decrease in size.

Abiding by the upper limit of 1.0 to condition (13) allows the positive refracting power to be shared by both surfaces of the image-side second positive lens L23, working for correction of spherical aberrations.

Desirously, the imaging apparatus of the invention comprises the aforesaid imaging optical system, an imaging device that is located on the image side of the aforesaid imaging optical system to convert an image formed through the aforesaid imaging optical system into electric signals, and an optical path splitter member that is interposed between the aforesaid imaging optical system and the aforesaid imaging device to split an optical path into an optical path for forming an image for observation and an optical path for forming the image to be taken.

The imaging optical system of the invention is easy to make sure the given back focus; so it is preferably used for interchangeable lenses for single-lens reflex cameras or the like.

In short, advantage is taken of the long back focus to locate between the imaging optical system and the imaging device the optical path splitter member such as a quick return mirror and a half-silvered mirror (by which the optical path is split in both the time split mode and the light quantity split mode), thereby forming the optical path for forming the image to be taken and the optical path for forming an image for observation.

The image for observation may be viewed as follows. An image formed on a focusing screen may be viewed directly or via a viewing optical system. Alternatively, the image for observation may be taken by means of the imaging device to show that image on a display device, which may in turn be viewed directly or via an optical system.

Preferably, the aforesaid requirements should be satisfied in combinations of two or more.

Of condition (1), the lower and upper limit values should more preferably be set at 2.313 and 5.294, respectively.

Of condition (2), the lower and upper limit values should more preferably be set at 0.814 and 0.955, respectively.

Of condition (3), the lower and upper limit values should more preferably be set at 0.567 and 0.843, respectively.

Of condition (4), the lower and upper limit values should more preferably be set at 2.476 and 3.179, respectively.

Of condition (5), the lower and upper limit values should more preferably be set at −4.0, esp. −3.3 and −1.7, esp. −1.9, respectively.

Of condition (6), the lower and upper limit values should more preferably be set at 0.22, esp. 0.23 and 0.39, esp. 0.38, respectively.

Of condition (7), the lower and upper limit values should more preferably be set at −1.8, esp. −1.7 and −0.6, esp. −0.7, respectively.

Of condition (8), the lower and upper limit values should more preferably be set at −2.0, esp. −1.8 and −1.5, esp. −1.55, respectively.

Of condition (9), the lower and upper limit values should more preferably be set at −4.1, esp. −3.9 and −1.9, esp. −2.0, respectively.

Of condition (10), the lower and upper limit values should more preferably be set at 0.4, esp. 0.42 and 0.7, esp. 0.65, respectively.

Of condition (11), the lower and upper limit values should more preferably be set at 0.43, esp. 0.46 and 0.57, esp. 0.53, respectively.

Of condition (12), the lower and upper limit values should more preferably be set at 0.55, esp. 0.6 and 0.85, esp. 0.77, respectively.

Of condition (13), the lower and upper limit values should more preferably be set at 0.65, esp. 0.75 and 0.99, esp. 0.98, respectively.

According to the invention, there can be an imaging optical system provided that works for making sure the given back focus and slimming-down and is capable of making sure the desired brightness and optical performance. There can also be an imaging apparatus provided that comprises such an imaging optical system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 4 is an aberration diagram for Example 1 upon focusing on an object point at infinity.

FIG. 5 is an aberration diagram for Example 2 upon focusing on an object point at infinity.

FIG. 6 is an aberration diagram for Example 3 upon focusing on an object point at infinity.

DESCRIPTION OF EXEMPLARY EMBODIMENTS

Examples 1, 2 and 3 of the imaging optical system are now explained. Sectional views of the optical systems of Examples 1, 2 and 3 are presented in FIGS. 1, 2 and 3.

Figure 1:
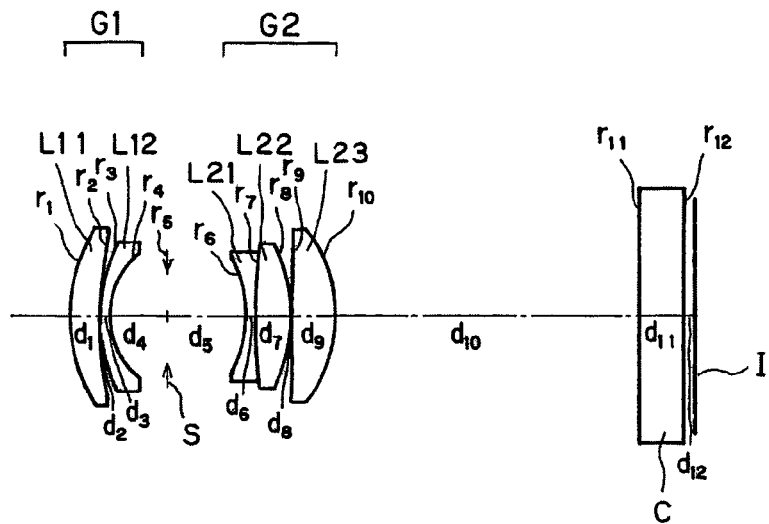
FIG. 1 is illustrative in lens arrangement section of Example 1 of the inventive imaging optical system.
Figure 2:
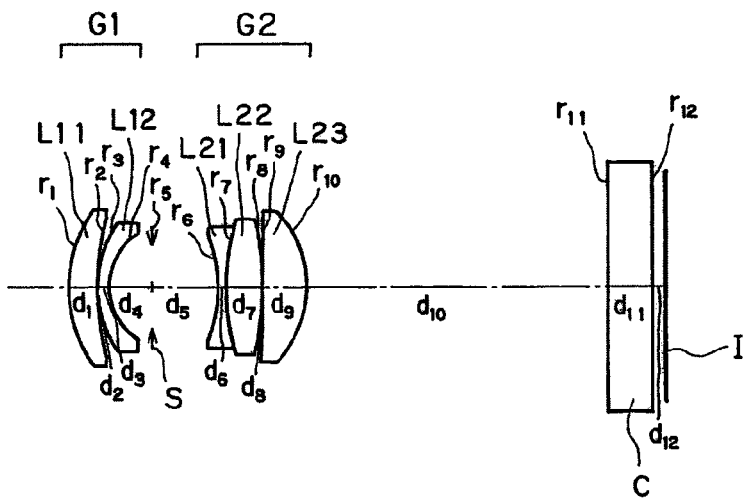
FIG. 2 is illustrative, as in FIG. 1, of Example 2 of the inventive imaging optical system.
Figure 3:
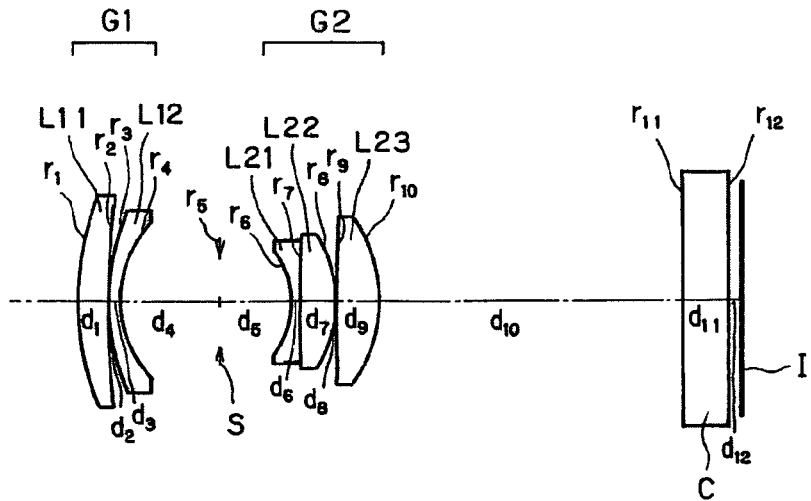
FIG. 3 is illustrative, as in FIG. 1, of Example 3 of the inventive imaging optical system.

Throughout FIGS. 1, 2 and 3, G1 represents the object-side lens group, G2 the image-side lens group, S the aperture stop, F an optical low-pass filter, and I the image plane of a CCD. Note here that the single plane-parallel plate shown in FIGS. 1, 2 and 3 is indicative of various filters such as a low-pass filter, an infrared cut filter, and an ultrasonic vibration filter adapted to vibrate dusts off.

The imaging optical system of Example 1 is built up of, in order from its object side, the object-side lens group G1 of negative refracting power, the aperture stop S and the image-side lens group G2 of positive refracting-power, as shown in FIG. 1.

The object-side lens group G1 is made up of, in order from its object side, a positive meniscus lens that is convex on its object side and acts as the object-side positive meniscus lens L11 and a negative meniscus lens that is convex on its object side and acts as the object-side negative meniscus lens L12, and the image-side lens group G2 is made up of a cemented doublet of a double-concave negative lens acting as the image-side negative lens L21 and a double-convex positive lens acting as the image-side first positive lens L22, and a double-convex positive lens acting as the image-side second positive lens L23.

Two aspheric surfaces are used at both surfaces of the double-convex positive lens in the image-side lens group G2.

The imaging optical system of Example 2 is built up of, in order from its object side, the object-side lens group G1 of negative refracting power, the aperture stop S and the image-side lens group G2 of positive refracting power, as shown in FIG. 2.

The object-side lens group G1 is made up of, in order from its object side, a positive meniscus lens that is convex on its object side and acts as the object-side positive meniscus lens L11 and a negative meniscus lens that is convex on its object side and acts as the object-side negative meniscus lens L12, and the image-side lens group G2 is made up of a cemented doublet of a double-concave negative lens acting as the image-side negative lens L21 and a double-convex positive lens acting as the image-side first positive lens L22, and a double-convex positive lens acting as the image-side second positive lens L23.

Two aspheric surfaces are used at both surfaces of the double-convex positive lens in the image-side lens group G2.

The imaging optical system of Example 3 is built up of, in order from its object side, the object-side lens group G1 of negative refracting power, the aperture stop S and the image-side lens group G2 of positive refracting power, as shown in FIG. 3.

The object-side lens group G1 is made up of, in order from its object side, a positive meniscus lens that is convex on its object side and acts as the object-side positive meniscus lens L11 and a negative meniscus lens that is convex on its object side and acts as the object-side negative meniscus lens L12, and the image-side lens group G2 is made up of a cemented doublet of a double-concave negative lens acting as the image-side negative lens L21 and a double-convex positive lens acting as the image-side first positive lens L22, and a double-convex positive lens acting as the image-side second positive lens L23.

Two aspheric surfaces are used at both surfaces of the double-convex positive lens in the image-side lens group G2.

Enumerated below are numerical data in the respective examples.

Referring to the numerical data on the lenses in the respective examples, r is the radius of curvature of each lens surface, d is the thickness or spacing of each lens, nd is the d-line refracting index of each lens, υd is the d-line Abbe constant of each lens, K is the conic coefficient, A4, A6, A8 and A10 are the aspheric coefficients, and E±N is ×10$^{\pm N}$.

Each aspheric configuration is given by the following equation, using each aspheric coefficient in each example.

$$Z=(Y^2/r)/[1+\{1-(1+K)\cdot(Y/r)^2\}^{1/2}]+A4\times Y^4+A6\times Y^6+A8\times Y^8+A10\times Y^{10}$$

where Z is the coordinates in the optical axis direction, and Y is the coordinates in the vertical direction to the optical axis.

Numerical Example 1

Unit mm

Surface data

| Surface number | r | d | nd | νd |
|---|---|---|---|---|
| 1 | 17.064 | 2.80 | 1.80610 | 33.27 |
| 2 | 36.465 | 0.13 | | |
| 3 | 16.356 | 0.95 | 1.69680 | 55.53 |
| 4 | 7.966 | 5.57 | | |
| 5 (Stop) | ∞ | 7.70 | | |
| 6 | −10.584 | 0.83 | 1.75520 | 27.51 |
| 7 | 84.666 | 3.36 | 1.69680 | 55.53 |
| 8 | −16.611 | 0.15 | | |
| 9 (Aspheric) | 670.610 | 4.20 | 1.74250 | 49.30 |
| 10 (Aspheric) | −13.770 | 29.75 | | |
| 11 | ∞ | 4.57 | 1.51633 | 64.14 |
| 12 | ∞ | 1.06 | | |
| Image plane | ∞ | | | |

Aspheric data

9th Surface

K = −999.0134, A4 = −1.7520E−05, A6 = 5.9396E−08, A8 = −1.9307E−09, A10 = 1.1985E−12

10th Surface

K = 0.4098, A4 = 3.1377E−06, A6 = 2.1734E−08, A8 = −5.7979E−10, A10 = −1.2876E−11

Various data

| | |
|---|---|
| Focal length | 25.38 |
| F-number | 2.9 |
| Half angle of view | 24.9 |
| Image height | 11.150 |
| Full lens length | 57.720 |
| BF | 32.034 |

Lens data

| Lens | Start surface | Focal length |
|---|---|---|
| L11 | 1 | 37.380 |
| L12 | 3 | −23.373 |
| L21 | 6 | −12.411 |
| L22 | 7 | 20.204 |
| L23 | 9 | 18.220 |

Numerical Example 2

Unit mm

Surface data

| Surface number | r | d | nd | vd |
|---|---|---|---|---|
| 1 | 14.179 | 2.80 | 1.80610 | 33.27 |
| 2 | 27.380 | 0.13 | | |
| 3 | 12.478 | 0.95 | 1.78650 | 50.00 |
| 4 | 6.504 | 4.23 | | |
| 5 (Stop) | ∞ | 6.37 | | |
| 6 | −15.597 | 0.83 | 1.76182 | 26.52 |
| 7 | 27.085 | 3.36 | 1.69680 | 55.53 |
| 8 | −36.000 | 0.15 | | |
| 9 (Aspheric) | 356.666 | 4.20 | 1.74250 | 49.30 |
| 10 (Aspheric) | −11.783 | 29.75 | | |
| 11 | ∞ | 4.57 | 1.51633 | 64.14 |
| 12 | ∞ | 1.06 | | |
| Image plane | ∞ | | | |

Aspheric data

9th Surface $K = 233.0929, A4 = -2.9412E-05, A6 = -2.3456E-07,$
$A8 = 7.1848E-09, A10 = -8.4208E-11$ 10th Surface $K = 0.3428, A4 = 2.0611E-06, A6 = -2.4195E-07, A8 = 3.9420E-09,$
$A10 = -5.3603E-11$

Various data

| | |
|---|---|
| Focal length | 25.50 |
| F-number | 2.9 |
| Half angle of view | 24.8 |
| Image height | 11.150 |
| Full lens length | 55.047 |
| BF | 32.033 |

Lens data

| Lens | Start surface | Focal length |
|---|---|---|
| L11 | 1 | 33.326 |
| L12 | 3 | −18.575 |
| L21 | 6 | −12.884 |
| L22 | 7 | 22.678 |
| L23 | 9 | 15.437 |

Numerical Example 3

Unit mm

Surface data

| Surface number | r | d | nd | vd |
|---|---|---|---|---|
| 1 | 31.235 | 2.80 | 1.74000 | 28.30 |
| 2 | 91.658 | 0.13 | | |
| 3 | 25.747 | 0.95 | 1.48749 | 70.23 |
| 4 | 10.936 | 9.82 | | |
| 5 (Stop) | ∞ | 6.92 | | |
| 6 | −8.559 | 0.83 | 1.68893 | 31.07 |
| 7 | 500.006 | 3.36 | 1.60300 | 65.44 |
| 8 | −13.578 | 0.15 | | |
| 9 (Aspheric) | 123.829 | 4.20 | 1.67790 | 55.34 |
| 10 (Aspheric) | −13.569 | 29.88 | | |
| 11 | ∞ | 4.57 | 1.51633 | 64.14 |
| 12 | ∞ | 1.06 | | |
| Image plane | ∞ | | | |

Aspheric data

9th Surface $K = -80.9211, A4 = -1.8642E-05, A6 = 1.3284E-07,$
$A8 = -3.2044E-09, A10 = -1.5415E-11$ 10th Surface $K = -0.4375, A4 = 5.0738E-06, A6 = 4.0676E-08, A8 = 4.5114E-10,$
$A10 = -4.7840E-11$

Various data

| | |
|---|---|
| Focal length | 24.49 |
| F-number | 2.9 |
| Half angle of view | 25.7 |
| Image height | 11.150 |
| Full lens length | 61.425 |
| BF | 32.257 |

Lens data

| Lens | Start surface | Focal length |
|---|---|---|
| L11 | 1 | 62.791 |
| L12 | 3 | −39.838 |
| L21 | 6 | −12.207 |
| L22 | 7 | 21.976 |
| L23 | 9 | 18.265 |

Aberration diagrams for Examples 1, 2 and 3 upon focusing on an object point at infinity are presented in the form of FIGS. 4, 5 and 6. In the diagrams here for spherical aberrations and chromatic aberrations of magnification, the solid line, broken line and one-dotted line are indicative of the quantities (mm) of aberrations with respect to the C-line, d-line and F-line, respectively; in the diagrams for astigmatisms here, the solid line S and broken line M are indicative of the sagittal image plane (mm) and the meridional image plane (mm), respectively, and in the diagrams for distortions, the solid line is indicative of distortion (%) with respect to the d-line.

The aberration diagrams are drawn with an image circle larger than the aforesaid image height. The technique of shifting the imaging device in the vertical plane to the optical axis of the imaging optical system to reduce influences of shake of the imaging apparatus goes mainstream; however, the optical system of the invention is designed to achieve good image quality even when such shake is corrected.

Tabulated below are the values of conditions (1) to (13) in each of the above examples.

| Condition | Example 1 | Example 2 | Example 3 |
|---|---|---|---|
| (1) | 3.444 | 2.314 | 5.293 |
| (2) | 0.876 | 0.815 | 0.954 |
| (3) | 0.675 | 0.568 | 0.842 |
| (4) | 2.899 | 3.178 | 2.477 |
| (5) | −2.759 | −3.148 | −2.034 |
| (6) | 0.292 | 0.366 | 0.232 |
| (7) | −0.921 | −0.728 | −1.627 |
| (8) | −1.599 | −1.794 | −1.576 |
| (9) | −2.526 | −3.723 | −2.043 |
| (10) | 0.637 | 0.433 | 0.630 |
| (11) | 0.492 | 0.492 | 0.492 |
| (12) | 0.718 | 0.605 | 0.746 |
| (13) | 0.960 | 0.936 | 0.802 |

In each example, focusing from far distances to near distances may be implemented by various ways, for instance, by letting out the imaging optical system on its entirety, letting out the imaging optical system while changing the spacing between the object-side lens group and the image-side lens group or letting out the image-side lens group alone.

Figure 7:
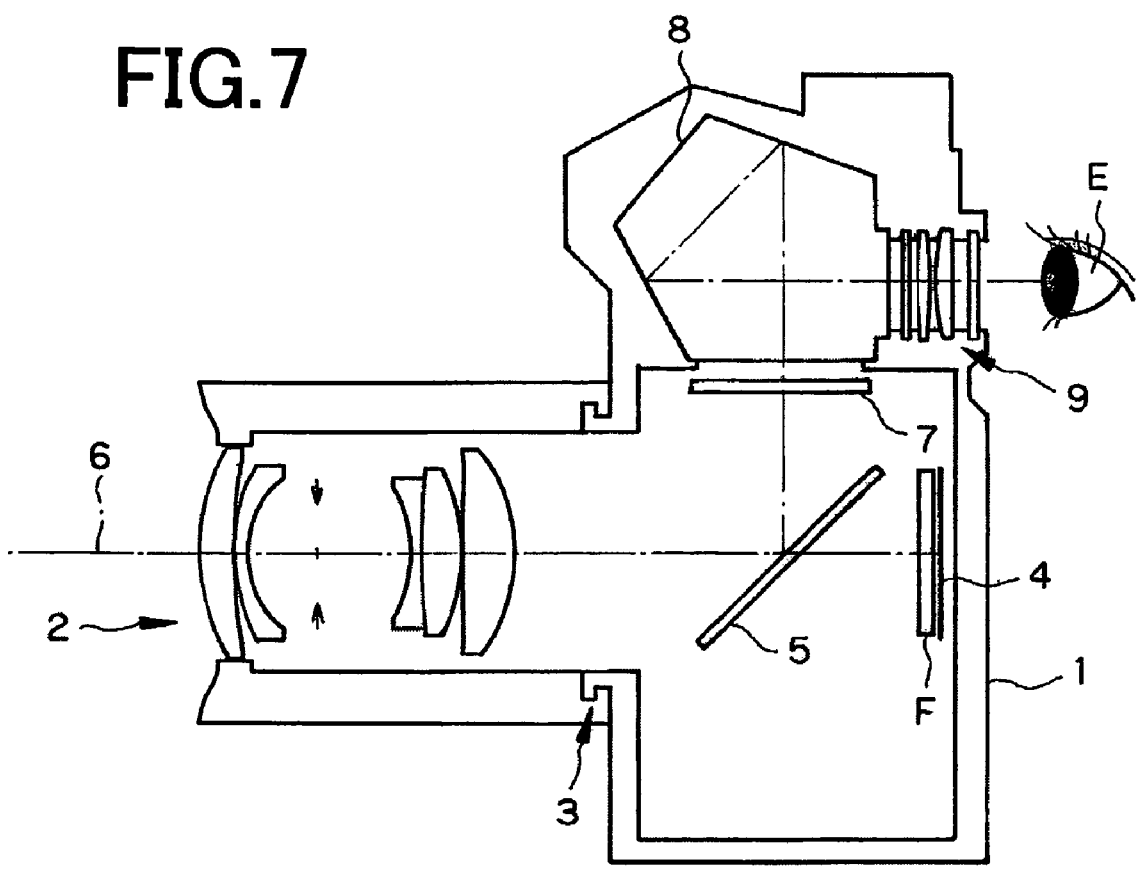
FIG. 7 is a sectional view of a single-lens reflex camera in which the inventive imaging optical system is used as an interchangeable lens.

FIG. 7 is a sectional view of the single-lens reflex camera that operates as an electronic imaging apparatus wherein the inventive imaging optical system is used and a small-format CCD or C-MOS or the like is used as the imaging device. In FIG. 7, reference numeral 1 is the single-lens reflex camera, 2 the imaging optical system mounted in a lens barrel and 3 a mount portion of the lens barrel that enables the imaging optical system 2 to be attached to or detached from the single-lens reflex camera 1. For that mount, a screw type mount, a bayonet type mount or the like may be used. In this example, the bayonet type mount is used.

Reference numeral 4 is the imaging device surface, 5 is a quick return mirror interposed between the lens system and the imaging device surface 4 on an optical path 6 through the imaging lens system 2, 7 a finder screen located in an optical path taken by light reflected off the quick return mirror 5, 8 a penta prism, 9 a finder, and E the eye of the viewer (eye point).

The inventive imaging optical system exemplified by Example 1, 2, and 3, for instance, may be used as the imaging optical system 2 of the single-lens reflex camera 2 arranged as mentioned above.

What is claimed is:

1. An imaging optical system, comprising:
    an aperture stop for limiting an axial light beam,
    an object-side lens group that is located on an object side of said aperture stop and has negative refracting power, and
    an image-side lens group that is located on an image side of said aperture stop and has positive refracting power, wherein:
    said object-side lens group comprises, in order from its object side, an object-side positive meniscus lens that is convex on its object side and has positive refracting power and an object-side negative meniscus lens that is convex on its object side and has negative refracting power,
    said image-side lens group comprises, in order from its object side, an image-side negative lens, an image-side first positive lens and an image-side second positive lens,
    said image-side negative lens and said image-side first positive lens adjacent thereto form together a cemented doublet, and
    said imaging optical system has a total of five lenses, with satisfaction of the following conditions (1), (2) and (3):

$$2.3 \leq |f1/f| \leq 5.3 \quad (1)$$

$$0.8 \leq f2/f \leq 1.0 \quad (2)$$

$$0.55 \leq L/f \leq 0.85 \quad (3)$$

where f is a focal length of the whole imaging optical system,
    f1 is a focal length of the object-side lens group in said imaging optical system,
    f2 is a focal length of the image-side lens group in said imaging optical system, and
    L is an axial distance from a vertex of the lens surface located in, and nearest to the object side of, said object-side lens group to a vertex of the lens surface located in, and nearest to the object side of, said image-side lens group.

2. The imaging optical system according to claim 1, wherein said cemented doublet has a meniscus shape that is concave on the aperture stop side, and said image-side second positive lens is convex on its image-side surface.

3. The imaging optical system according to claim 1, wherein said image-side negative lens is a double-concave negative lens and said image-side first positive lens is a double-convex positive lens.

4. The imaging optical system according to claim 1, wherein at least one of said image-side first positive lens or said image-side second positive lens has an aspheric convex shape whose positive refracting power becomes weak from an optical axis to its periphery.

5. The imaging optical system according to claim 4, wherein an object-side surface of said image-side second positive lens is said aspheric convex surface.

6. The imaging optical system according to claim 4, wherein an image-side surface of said image-side second positive lens is said aspheric convex surface.

7. The imaging optical system according to claim 1, wherein said object-side negative meniscus lens satisfies the following condition (4):

$$2.4 \leq (R12f + R12r)/(R12f - R12r) \leq 3.2 \quad (4)$$

where R12f is a paraxial radius of curvature of an object-side lens surface of said object-side negative meniscus lens, and
    R12r is a paraxial radius of curvature of an image-side lens surface of said object-side negative meniscus lens.

8. The imaging optical system according to claim 1, wherein:
    said object-side positive meniscus lens and said object-side negative meniscus lens are each a single lens,
    an image-side surface of said object-side positive meniscus lens has a paraxial radius of curvature larger than that of an object-side surface of said object-side negative meniscus lens, and
    said object-side positive meniscus lens satisfies the following conditions (5) and (6):

$$-5.0 \leq (R11f + R11r)/(R11f - R11r) \leq -1.3 \quad (5)$$

$$0.2 \leq D1/L \leq 0.4 \quad (6)$$

where R11f is a paraxial radius of curvature of the object-side lens surface of said object-side positive meniscus lens in the object-side lens group,
    R11r is a paraxial radius of curvature of the image-side lens surface of said object-side positive meniscus lens in the object-side lens group, and
    D1 is an axial distance of said object-side lens group from a vertex of the lens surface located nearest to the object side to a vertex of the lens surface located nearest to the image side.

9. The imaging optical system according to claim 1, which further satisfies the following conditions (7) and (8):

$$-2.0 \leq f12/f \leq -0.5 \quad (7)$$

$$-2.3 \leq f11/f12 \leq -1.4 \quad (8)$$

where f11 is a focal length of the object-side positive meniscus lens, and
    f12 is a focal length of the object-side negative meniscus lens.

10. The imaging optical system according to claim 1, wherein said cemented doublet satisfies the following conditions (9) and (10):

$$-4.5 \leq R21f/D2122 \leq -1.7 \quad (9)$$

$$0.35 \leq R21f/R22r \leq 0.80 \quad (10)$$

where R21*f* is a paraxial radius of curvature of the object-side lens surface of said image-side negative lens, D2122 is an axial thickness of said cemented doublet from a vertex of the lens surface located nearest to the object side to a vertex of the lens surface located nearest to the image side, and R22*r* is a paraxial radius of curvature of the image-side lens surface of said image-side first positive lens.

11. The imaging optical system according to claim 1, wherein said cemented doublet satisfies the following conditions (11) and (12):

$$0.40 \leq D23/D2 \leq 0.60 \quad (11)$$

$$0.50 \leq f23/f \leq 0.90 \quad (12)$$

where D2 is an axial distance of said image-side lens group from a vertex of the lens surface located nearest to the object side to a vertex of the lens surface located nearest to the image side, D23 is an axial thickness of said image-side second positive lens, and f23 is a focal length of said image-side second positive lens.

12. The imaging optical system according to claim 1, wherein said image-side second positive lens satisfies the following condition (13):

$$0.5 < (R23f + R23r)/(R23f - R23r) < 1.0 \quad (13)$$

where R23*f* is a paraxial radius of curvature of the object-side lens surface of said image-side second positive lens, and R23*r* is a paraxial radius of curvature of the image-side lens surface of said image-side second positive lens.

13. An imaging apparatus, comprising:

an imaging optical system, an imaging device that is located on an image side of said imaging optical system and adapted to convert an image formed through said imaging optical system into electric signals, and an optical path splitter member that is interposed between said imaging optical system and said imaging device and adapted to split an optical path into an optical path for forming an image for observation and an optical path for forming an image to be taken, wherein said imaging optical system is an imaging optical system as recited in claim 1.

* * * * *